United States Patent [19]

Pimental

[11] Patent Number: 4,991,105
[45] Date of Patent: Feb. 5, 1991

[54] MICROPROCESSOR CONTROLLED GROUND SYSTEM MONITOR

[75] Inventor: LeRoy G. Pimental, Brockway, Pa.

[73] Assignee: Accu-Scan, Inc., DuBois, Pa.

[21] Appl. No.: 287,202

[22] Filed: Dec. 21, 1988

[51] Int. Cl.[5] .................. G06F 15/56; H04M 1/00
[52] U.S. Cl. .................. 364/483; 324/510; 340/650; 364/481; 379/26
[58] Field of Search ............. 379/1, 2, 26, 331, 378; 361/42, 47, 48, 50, 56, 87, 124; 324/509, 510; 340/649, 650, 651, 652, 653; 364/481, 483, 550

[56] References Cited

U.S. PATENT DOCUMENTS

| 3,339,028 | 8/1967 | Taugner . | |
|---|---|---|---|
| 3,944,914 | 3/1976 | Simmonds | 379/26 |
| 3,947,730 | 3/1976 | De Luca et al. | 361/124 |
| 3,996,496 | 12/1976 | Volk, Jr. | 340/649 |
| 4,153,923 | 5/1979 | Graf | 324/510 |
| 4,197,435 | 4/1980 | Jackson et al. | 379/2 |
| 4,228,475 | 10/1980 | Sherwood | 324/510 |
| 4,321,643 | 3/1982 | Vernier | 324/509 |
| 4,415,850 | 11/1983 | Sherwood | 324/509 |
| 4,528,427 | 7/1985 | Gadonna et al. | 379/26 |
| 4,529,929 | 7/1985 | Berggren | 324/509 |
| 4,551,811 | 11/1985 | Taniguti | 324/510 |
| 4,644,437 | 2/1987 | Robe | 361/56 |
| 4,809,123 | 2/1989 | Allington et al. | 324/509 |
| 4,855,671 | 8/1989 | Fernandes | 364/483 |
| 4,864,242 | 9/1989 | Hurley | 324/510 |
| 4,866,391 | 9/1989 | Latham, Jr. | 340/649 |

*Primary Examiner*—Kevin J. Teska
*Attorney, Agent, or Firm*—Nixon & Vanderhye

[57] ABSTRACT

A system for monitoring a grounding system is permanently installed in, for example, a telephone switching office. The system operates to scan a large number of ground conductors at the master ground bar by using amplified Hall effect sensors to monitor AC and DC current on the conductors. If a surge enters the telephone switching office, the surge is coupled to ground. The system monitors these ground conductors to insure that the ground system is operating properly. The microprocessor continuously insures that readings are taken of the current on each of the ground conductors. The microprocessor compares the current readings with preset parameters. If a reading exceeds the predetermined parameter threshold, an alarm report is generated. The report lists not only the current on the conductor which was the source of the surge, but also shows any current increase on the other ground conductors that are monitored. Thus, if the surge comes in on one of the ground conductors and goes out on other ground conductors and into the office equipment, the present system will indicate such and generate an alarm report to permit detection and correction of any problems.

29 Claims, 7 Drawing Sheets

PARAMETERS FOR EACH CHANNEL WILL BE SHOWN. PRESS SPACE BAR TO RETAIN PARAMETER SHOWN AND CONTINUE TO NEXT PARAMETER. PRESS CARRIAGE RETURN TO MODIFY PARAMETER. PARAMETERS MUST BE ENTERED AS 2 DIGITS FOLLOWED BY A DECIMAL POINT AND 2 MORE DIGITS (FOR EXAMPLE 08.35). THE LAST DIGIT MUST BE EITHER 0 OR 5.

CONDUCTOR 1 WILL BE REPORTED
  DC PARAMETER FOR CONDUCTOR 1 = 0.75
  DC PARAMETER FOR CONDUCTOR 1 = 00.00
  AC PARAMETER FOR CONDUCTOR 1 = 5.50
  SURGE PARAMETER FOR CONDUCTOR 1 = 10.00

CONDUCTOR 2 WILL BE REPORTED
  DC PARAMETER FOR CONDUCTOR 2 = 3.50
  AC PARAMETER FOR CONDUCTOR 2 = 2.25
  SURGE PARAMETER FOR CONDUCTOR 2 = 10.00

*Fig. 6*

| | SITE ID | >>>> ALARM REPORT <<<< | 10:40:10-AM 10/25/88 |
|---|---|---|---|
| | AC AMPS | DC AMPS | |
| 1 | 5.10 | 0.30 | |
| 2 | 1.45 | 2.55 | |
| 3 | 0.30 | 0.20 | |
| 4 | 0.00 | -0.10 | |
| 5 | 0.05 | -0.10 | |
| 6 | 0.55 | 1.65 | |
| 7 | 0.50 | 1.25 | |
| 8 | 0.10 | -0.05 | |
| 9 | 1.40 | 7.35 | |
| 10 | 0.00 | -3.00 | |
| 11 | 0.80 | -12.55 | |

*Fig. 7A*

| | SITE ID | >>>> ALARM REPORT <<<< | 10:40:17-AM 10/25/88 |
|---|---|---|---|
| | AC AMPS | DC AMPS | |
| 1 | 5.00 | 0.40 | |
| 2 | 1.45 | 2.50 | |
| 3 | 0.30 | 0.15 | |
| 4 | 0.00 | -0.10 | |
| 5 | 0.05 | -0.05 | |
| 6 | 0.60 | 1.65 | |
| 7 | 0.45 | 1.30 | |
| 8 | 0.10 | -0.05 | |
| 9 | 1.55 | 7.40 | |
| 10 | 0.00 | -3.05 | |
| 11 | 0.80 | -12.60 | |

*Fig. 7B*

MICROPROCESSOR CONTROLLED GROUND SYSTEM MONITOR

FIELD OF THE INVENTION

This invention relates to a ground system monitor for use in, for example, telephone switching offices. More particularly, the invention relates to a microprocessor controlled ground system monitor which monitors AC/DC current on a large number of ground conductors and which generates an alarm report listing, for example, the AC and DC current surge levels on all monitored conductors at an identified site.

BACKGROUND AND SUMMARY OF THE INVENTION

The microprocessor controlled ground system monitor of the present invention is preferably utilized to monitor the grounding system in a telephone switching office. In the past, telephone switching offices utilized electro-mechanical switching devices to couple communication lines to permit telephone communication between parties. In such a switching system contacts are physically made or broken.

Modern day telephone switching offices have shifted from electro-mechanical switching techniques to computerized switching. In computerized switching, no electro-mechanical moving parts are utilized, but rather control signals operate to trigger electronic switching.

One of the few advantages of a telephone switching office employing electro-mechanical switches and vacuum tube amplifiers is that such components are far less susceptible to damage due to current surges caused by, for example, electrical storms than their modern day counterparts. Modern day integrated circuit devices can't withstand voltage increases or current surges comparable to their predecessors.

Accordingly, it is particularly important for modern day telephone switching offices to include a failsafe grounding system which protects the valuable equipment in the telephone switching office and which likewise enhances the probability that the telephone switching office will remain operable even after being exposed to high voltage and current surges. With such a grounding system, if a current surge is transmitted to a telephone switching office, present single point grounding practices operate to couple the current on the ground conductors to a master ground bar in the telephone switching office. Thus, if a current surge is induced on a shielded bundle of wires by, for example, lightning or inadvertent contact with a high voltage line, the high voltage will be coupled to an earth ground. In this fashion, both personnel and equipment in the telephone switching offices are protected.

In addition to avoiding damage to valuable equipment such as, for example, the digital switching system in a telephone office, telephone service interruptions are also prevented by such a grounding system. Since the provision of telephone communications is the primary source of revenue for telephone companies, any disruption in service is extremely costly to such companies.

The computer controlled switching equipment in a telephone switching office includes isolated grounds. In this regard, although other pieces of telephone switching equipment are tied into the computer electrically, each piece of equipment includes its own ground. With all the equipment separately grounded, if there is a voltage rise, the voltage rise will be reflected equally such that there will not be a potential difference between pieces of equipment. In such circumstances, if a telephone switching office staff member touches two pieces of equipment, no injury will occur if both pieces of equipment are referenced to earth ground.

Unfortunately, as many telephone switching offices have expanded to include more equipment to enhance their communication capabilities, such equipment has been installed without isolating or properly grounding the new equipment. Such faulty installation of equipment has created a serious problem in many telephone switching offices throughout the country.

In the past, telephone switching office grounding systems have been monitored often by portable monitoring units used for troubleshooting and fault diagnosis. Such prior art monitoring systems, however, provided only a limited amount of diagnostic information.

For example, in the prior art, if a high voltage or current surge enters into a telephone switching office, all the switching office has heretofore been informed of is that a current surge caused damage to a particular piece of equipment. The switching office is not informed, for example, as to the origin of the current surge, i.e., which ground conductor the current surge came in on.

In accordance with the present invention, the telephone switching company can identify that the current surge came into the telephone switching office on a particular current conductor. The telephone office can then determine, for example, that although the current surge should have been coupled to ground some of the current surge was coupled to the frame of a particular telephone office equipment. With such data the telephone switching company can identify a faulty design in the grounding system and make appropriate modifications in order to prevent such damage from reoccurring. Thus, a telephone switching office is provided with instant notice that, for example, an outside contractor installed equipment that violates accepted grounding practices. This enables timely correction to prevent costly repairs to sensitive equipment and to prevent injury to personnel.

In accordance with the present invention, sensors associated with each of the ground conductors are periodically scanned so that the current on each of the ground conductors are continuously monitored. The present system utilizes a real time clock to generate time and date information to monitor and report data regarding the ground conductors over time.

The present invention may be utilized in conjunction with single point grounding systems used in telephone switching offices where all the ground conductors are coupled to a master ground bar. This master ground bar is the single reference point for the switching offices' positive voltage and for earth ground. The present invention monitors both the AC and DC current on the ground conductors at the master ground bar.

In accordance with the present invention, the microprocessor controlled ground system monitor when it is initially set up operates to generate alarm reports on a nearly continuous basis. From the initial reports, the current flow on all conductors is determined. From this data, it can be determined what current values are normal for that particular office. Such values are then utilized to select the user's preset alarm triggering parameters. Thus, values for parameters can be empirically determined so that alarm reports are not constantly generated. Such parameters, of course, should not be set to avoid the generation of reports under circumstances where corrective action is necessary.

The present invention permits the continuous monitoring of a large number of ground conductors while reading low current values from such ground conductors. In this regard, the current flowing through the conductor generates an electromagnetic field which induces current flow in the Hall effect transducer. The current flowing in each Hall effect transducer is sensed by a Hall effect sensor which generates a voltage indicative of the current flow (which is proportional to the Hall effect sensor current). These signals are amplified and coupled to a microprocessor which converts the detected voltage levels to current levels indicative of the current flowing through the associated ground conductor.

The present microprocessor controlled grounding system is permanently installed in, for example, a telephone switching office. The present invention operates to scan a large number of ground conductors at the master ground bar by using amplified Hall effect sensors to monitor AC and DC current on the conductors. If a surge enters the telephone switching office, the surge is coupled to ground.

The present invention monitors these ground conductors to insure that the ground system is operating properly. The microprocessor continuously insures that readings are taken of the current on each of the ground conductors. The microprocessor compares the current readings with preset parameters. If a reading exceeds the predetermined parameter threshold, an alarm report is generated.

The report lists not only the current on the conductor which was the source of the surge, but also shows any current increase on the other ground conductors that are monitored. Thus, if the surge comes in on one of the ground conductors and goes out on other ground conductors and into the office equipment, the present system will indicate such and generate an alarm report to permit detection and correction of any problems.

With such a report, a non-isolated ground conductor that is coupled to the master ground bar and to the frame of a particular piece of equipment may be carefully monitored. While such a conductor should have extremely little, if any, current on it, if such a conductor, for example, exhibits an increase in current by a factor of 10 or 100, the present invention provides time and date data to correlate the increase in the current on the ground conductor with some other event, e.g., the improper installation of a piece of equipment, an electrical storm, etc.

Under certain circumstances, this excess current on a ground conductor may lead to serious damage to the computer switching equipment if, for example, it is coupled with a high voltage surge. By virtue of the present invention, such damage can be avoided.

The present invention recognizes that relatively low level surge activity over a period of time may trigger enough error messages on the telephone switching company's computer to cause an interruption in service. In this regard, such error messages generated by such relatively low voltage surges may exceed authorized memory capacity thereby operating to temporarily disable the telephone switching office computer. By virtue of the monitoring accomplished by the present invention, such relatively low voltage surges may be coupled to earth ground without raising an error message at the telephone switching office. The present invention operates to monitor such relatively low voltage surges coming into a telephone switching office so that the telephone company can identify potential problems associated therewith.

The present invention allows for the generation of reports on a local teletype, display or printing terminal. Additionally, the present invention may be used in conjunction with a modem to automatically dial a central site telephone number to convey alarm status reports thereto. The modem may also be utilized to receive telephone calls from the central site to trigger the generation of a ground system status report on demand. Other changes may be made remotely in accordance with the present invention, such as to change parameters that are being monitored or adjust the real time clock (e.g., to reflect a change to day light savings time).

BRIEF DESCRIPTION OF THE DRAWINGS

These as well as other objects and advantages of this invention will be better appreciated by reading the following detailed description of the presently preferred exemplary embodiments taken in conjunction with the accompanying drawings of which.

DETAILED DESCRIPTION OF THE DRAWINGS

Figure 1:
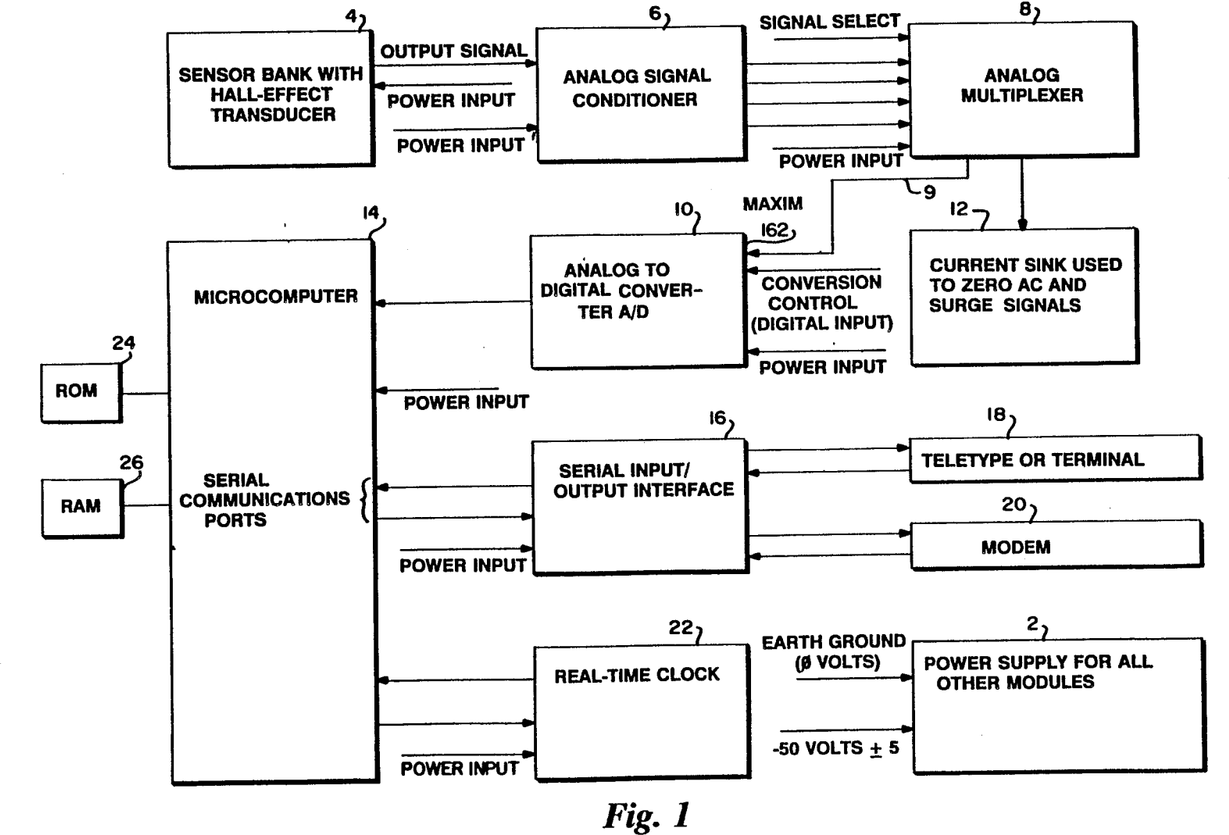
FIG. 1 is a hardware block diagram of a ground microprocessor controlled ground system monitor in accordance with an exemplary embodiment of the present invention.

FIG. 1 is a hardware block diagram of a microcomputer controlled ground system monitor in accordance with an exemplary embodiment of the present invention. Power supply 2 supplies power to all the modules in the system as indicated by the "power input" signals shown in FIG. 1. Thus, for example, power supply 2 supplies power to real time clock 22, microcomputer 14, and to the sensors associated with the Hall-effect transducers that are mounted on the conductors emanating from a master ground bar. Power supply 2 supplies the digital modules with its required voltage levels, e.g., ±5 volts. Likewise, the Hall effect sensors are provided with the voltage levels of ±5 volts.

The positive terminal of the power supply 2 is referenced to earth ground as represented in FIG. 1 as is conventional in many telephone office systems. The power supply supplies a virtual ground of −25 volts from which ±12 volts is supplied to power all modules except for the line drivers and line receivers used to communicate with the modem and the teletype. The modem and teletype power supply of ±12 volts is referenced from earth ground. A signal level translator establishes a communication link between digital hardware and communication line drivers and receivers. The power supply 2 additionally includes a battery backup (not shown) to provide backup power to the (real time) clock and the RAM 26 so that data is not lost in the event of a power failure.

The microprocessor controlled ground system monitor shown in FIG. 1 receives its input data from the bank 4 of sensors. As indicated above, Hall-effect transducers are associated with each of the ground conductors at the master ground bar in a single point grounding system such as is typically utilized in a central telephone office protection grounding system.

Figure 2:
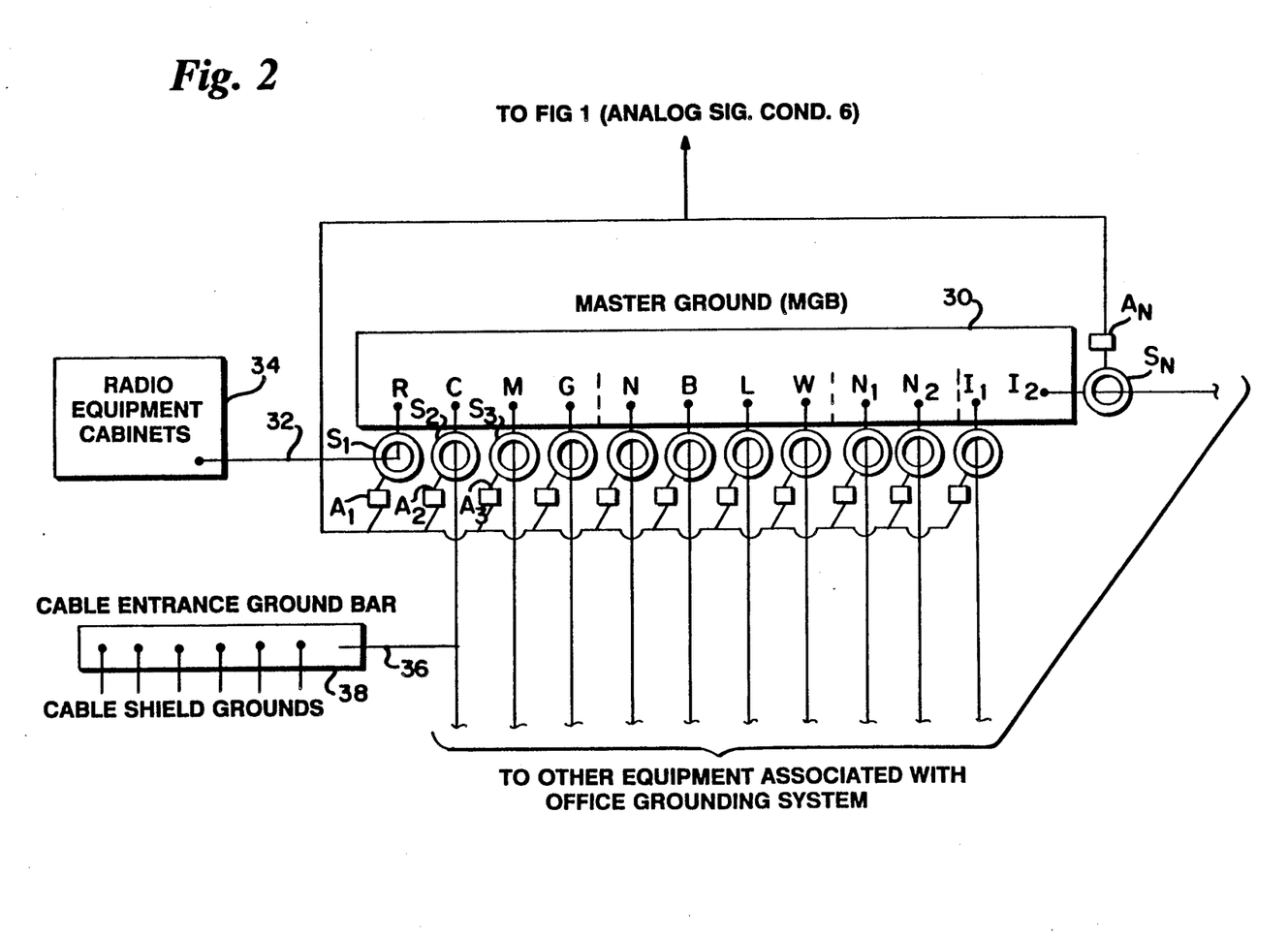
FIG. 2 is a diagram depicting a telephone switching office master ground bar and the associated ground conductor sensors.

FIG. 2 shows a portion of a central office protection grounding system. Such a grounding system may, for example, be as specified in the Rural Electrification Administration TE & C Manual-Section 810, Issue 6. Added to the central office protection grounding system are amplified Hall effect sensors $S_1, S_2, S_3 \ldots S_N$.

As shown in FIG. 2, a Hall effect sensor is associated with each of the system's ground conductors which are coupled to contacts R, C, M, G, N, B, L, W, $N_1$, $N_2$, $I_1$ and $I_2$ on the master ground bar 30.

As shown in FIG. 2, the Hall-effect sensors $S_1$ through $S_N$ are mounted around each of the ground conductors coupled to the master ground bar. The ground conductors coupled to the master ground bar are in turn coupled to other equipment throughout the office being protected by the grounding system. For example, the conductor 32 coupled to ground bar at contact R is in turn coupled to radio equipment cabinets 34. The ground conductor 36 may be, for example, coupled to a cable entrance ground bar 38 to thereby couple the cable entrance ground bar 38 to the master ground bar at point C. The cable entrance ground bar 38 is in turn coupled to the cable shield grounds or bonding ribbon as shown in FIG. 2. Although not shown in FIG. 2, it should be understood that the computerized switching system at the central office as well as other digital equipment in the central office is coupled to the master ground bar via ground conductors which are in turn coupled to an isolated ground window bar.

Associated with each of the doughnut shaped Hall-effect sensors $S_1 \ldots S_N$, is a Hall-effect transducer and amplifying circuit $A_1 \ldots A_N$ which generates the sensor output signal. The circuits $A_1 \ldots A_N$ associated with each Hall effect sensor include power supply and amplifying circuitry. In order to insure sensor stability, the sensors are actually powered by ±5 volts. The amplifying circuitry associated with each sensor $S_1$ through $S_N$ is utilized to amplify the signals coming from each of the associated sensors. Such amplifying circuitry is necessary in view of the very small current values that are being measured from each of the sensors $S_1$ through $S_N$.

Each of the circuits A1 through $A_N$ receive ±12 volts from power supply 2. Each circuit $A_1 \ldots A_N$ converts a received ±12 volts to ±5 volts. By virtue of these DC levels a current is generated in the associated sensor $S_1$ through $S_N$. The amplifying portion of $A_1$ is also powered by the ±5 volts. By virtue of the voltage conversion process from ±12 to ±5, the voltage applied to the Hall sensors in the amplifying circuits are regulated to insure stable voltage at each of the sensors. In this fashion, even if the voltage varies at the power supply, the voltage regulating circuitry within $A_1$ through $A_N$ insures that ±5 volts is utilized at each of the amplifiers $A_1$ through $A_N$.

The amplifiers A1 through AN are highly precise, stable amplifiers which amplify the signals coming from their associated Hall-effect sensors and transmit such signals to the analog signal conditioner 6 shown in FIG. 1 which will be described in detail below. By amplifying the very small voltage signals generated by each of the Hall effect transducers, the accuracy of the present system is considerably enhanced. The Hall-effect sensors $S_1$ through $S_N$ measures AC and DC current of up to, for example, 100 amps.

Associated with each of the sensors $S_1$ through $S_N$ and amplifiers $A_1 - A_N$ shown in FIG. 2 is an analog signal conditioner 6 shown in FIG. 1. Thus, if there are 16 sensors S1 through S16, there will be one signal conditioner for each of the 16 sensors. An analog signal conditioner 6 separates the output signal from each circuit $A_1 - A_N$ into four components, i.e., AC level, DC level, and positive and negative surge signals for each of the sensors $S_1$. The AC level signal is determined by a peak to peak voltage measurement of the signal output from the sensor.

Figure 3:
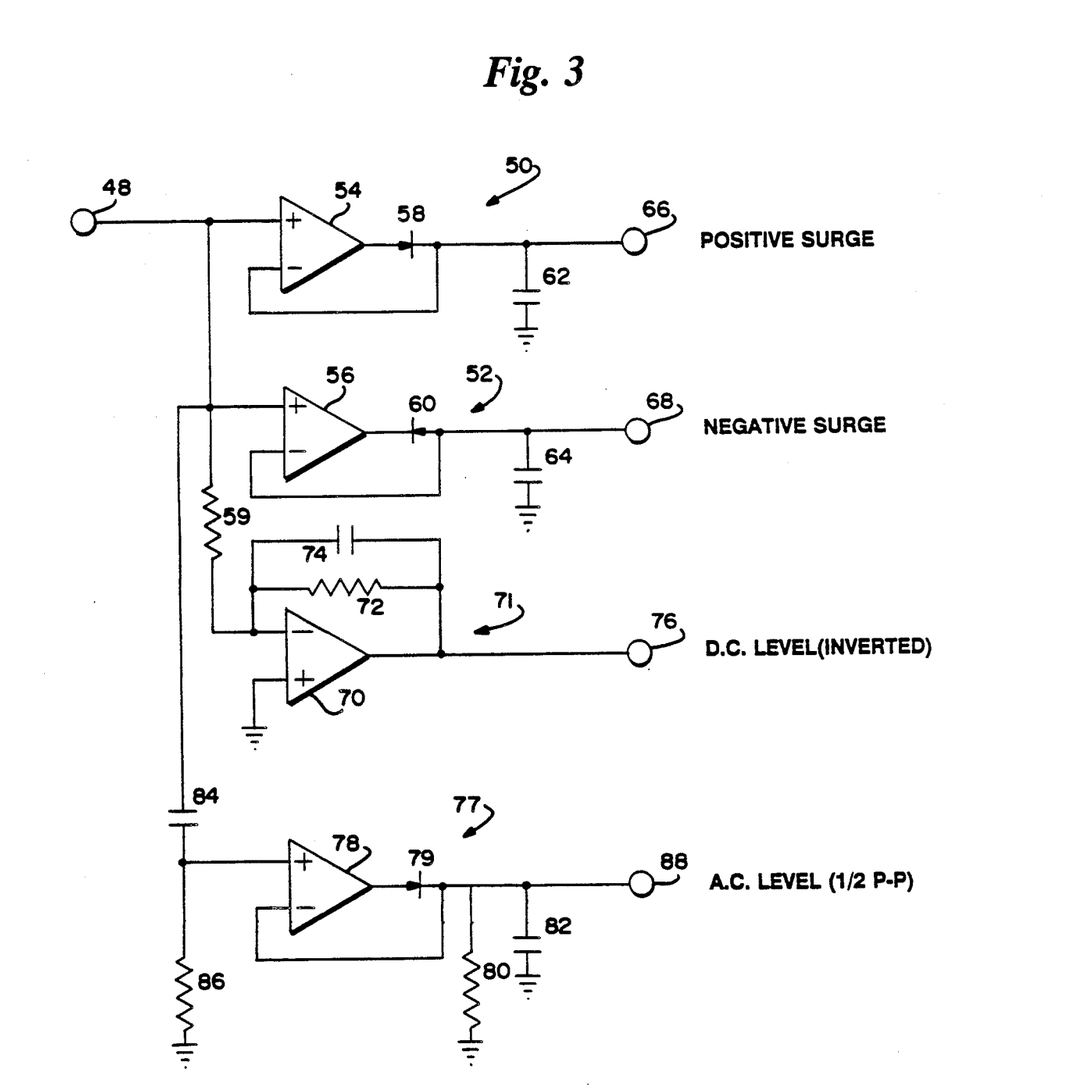
FIG. 3 is a schematic diagram showing the analog signal conditioning hardware for one channel.

As shown in the exemplary implementation in FIG. 3, the analog signal conditioner 6 includes detecting circuits 50, 52. For example, the output from amplifier A1 which is coupled to sensor S1 shown in FIG. 2 is input to the circuit shown in FIG. 3 at node 48. The peak detector circuits 50, 52 which comprise the surge channels include an amplifier 54, 56 which is coupled to a diode 58, 60 which in turn is coupled to capacitors 62 and 64 which are coupled to ground. The diodes 58 and 60 are additionally coupled to inverting inputs of amplifier 54, 56, respectively.

In operation, assume a relatively high voltage is coupled to input 48 shown in FIG. 3. If the spike is a positive spike, diode 58 will be forward biased and capacitor 62 will be charged. Diode 60 will block the flow of current due to the voltage spike so that capacitor 64 will not be charged by such a positive spike. Thus, due to the opposite polarity disposition of diodes 58 and 60, if there is a negative surge, capacitor 64 will be charged and diode 58 will serve to block current flow which would charge capacitor 62. The positive and negative output spike signals, as will be described further below, are compared by the microcomputer 14 with preset parameters and if the parameters are exceeded then an alarm report is generated. Accordingly, for each sensor S1—SN, there is a spike detector having two capacitors and two diodes as shown in FIG. 3 to thereby generate positive and negative spike surge outputs at outputs 66 and 68, respectively. Thus, the positive surge channel 50 tracks positive signals and retains the maximum positive signal and the negative surge channel 52 tracks negative signals and retains the maximum negative signal.

The direct current channels and the alternating current channels generate output signals at outputs 76 and 88, respectively. The direct current channel includes an amplifier 70 whose non-inverting input is grounded and whose inverting input is coupled to resistor 59 which is in turn coupled to the non-inverting input of amplifiers 56 and 54. The output of amplifier 70 is fed back to its inverting input via resistor 72 and parallel coupled capacitor 74. The direct current channel circuit 71 is a signal follower which filters out alternating current signal.

The alternating current channel includes an amplifier 78 whose output is coupled to diode 79. The output of diode 79 is fed back back to the inverting input of amplifier 78. The non-inverting input of amplifier 78 is coupled to resistor 86 (which is also coupled to ground) and DC blocking capacitor 84 (which is in turn coupled to the non-inverting input of amplifiers 54 and 56). Diode 79 is also coupled to resistor 80 and capacitor 82 which are connected in parallel and are connected to ground. The alternating current channel circuitry 77 operates as a half wave rectifier and peak detector. It is coupled to the incoming signal on input 48 through capacitor 84 to eliminate direct current signals. Each of the amplifier 54, 56, 70 and 78 may be, for example, a Harris 4741 amplifier.

Thus, the analog signal conditioner 6 thus generates 4 signals for each of the sensors S1—SN (positive spike negative spike, DC level and AC level). These signals are coupled to analog multiplexer 8 shown in FIG. 1. Thus, if there are 16 sensors, i.e., $S_1$ through $S_N$, the analog multiplexer 8 would select any one of 64 signals input from analog signal conditioner 6 (signals generated from each sensor). The output generated by analog multiplexer 8 is selected by microcomputer 14 on the "signal select" input. Thus, if 64 signals are being input from analog signal conditioner 6 to analog multiplexer 8, microcomputer 14 via a 6-bit code coupled to the "signal select" input uniquely selects one of the input signals to be output on line 9 for processing by analog-to-digital converter 10. The multiplexer 8 also serves to zero AC and surge signals by coupling such signals to current sink 12.

The analog-to-digital converter 10 digitizes the signals received from analog multiplexer 8 to resolution of 50 milliamps over a ±100 amp range. The digitized output from analog-to-digital converter 10 is coupled to microcomputer 14. The microcomputer 14 as will be described further below compares the signal received from analog-to-digital converter 10 with a preset parameter which defines an alarm and/or reporting condition. The analog to digital converter 10 is conventional and may, for example, be a MAXIM 162, a commercially available 12-bit successive approximation analog-to-digital converter.

If sensed signals from any one of the sensors S1 through SN exceed a preset parameter, then all of the sensed signals from sensors S1 through SN are stored and printed out on, for example, terminal 18 via its serial input/output interface 16. Signals are transmitted by microcomputer 14 to, for example, terminal 18 via serial communication ports which are coupled to serial input/output interface 16. Interface 16 converts the digital signals from microcomputer 14 to, for example, an RS 232 level (with signal ground equal to earth ground).

The serial input/output interface 16 includes at least two bidirectional I/0 channels, one for transmitting information to and receiving information from teletype terminal 18 and one for transmitting information to and receiving information from modem 20. Transmissions to teletype (or printing) terminal 18 serve to generate a hard copy printout on site. Transmissions from the serial input/output interface 16 to modem 20 allow for transmissions over telecommunication medium to a central site (not shown). Additionally, as will be described further below, signals from the modem 20 may be utilized to initiate the downloading of a status report on the Hall effect sensors on demand by a remotely located central station. The serial input/output interface 16 may be a commercially available interface such as, for example, National Semiconductor 324.

The reports which are generated include both time of day and date information generated by real time clock 22. The microcomputer 14 receives such data from clock 22 and can control the clock to reset it to, for example, reflect a change to daylight savings time. Signals transmitted from microcomputer 14, to real time clock 22 are also utilized to trigger the read out of the clock for report generation.

The ground system monitor of the present invention is under microprocessor control. In this regard, microcomputer 14, may, for example, include a commercially available 8-bit microprocessor such as a Hitachi HD64180. Microcomputer 14 also includes at least one ROM 24 for storing system and applications programs and at least one RAM 26 which is utilized for storing program, sensor and other data. The contents of RAM 26 as preserved by the battery backup associated with power supply 2 in the event of a power failure.

Figure 4:
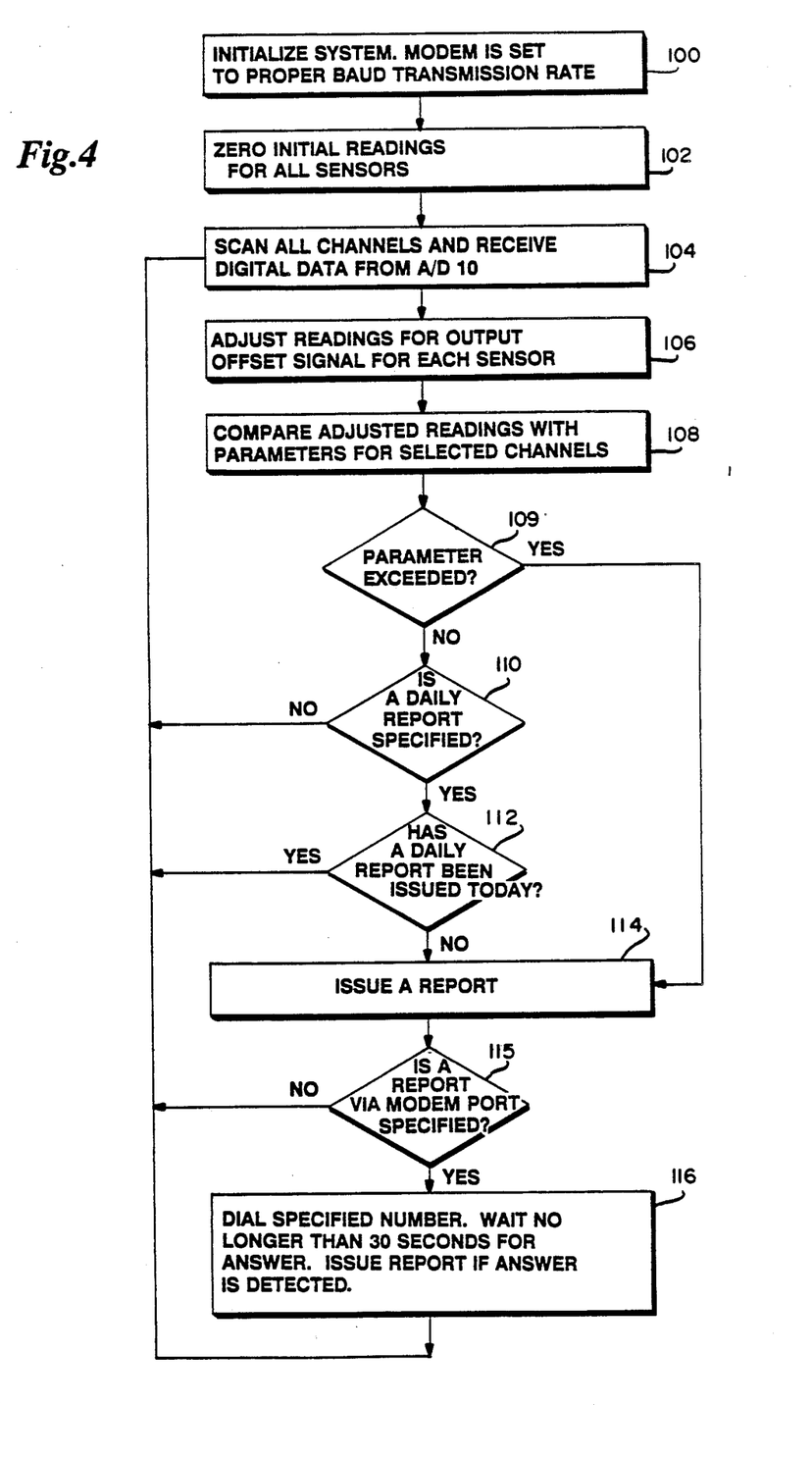
FIGS. 4 and 5 are flowcharts delineating the sequence of operations performed by the microcomputer shown in FIG. 1.
Figure 5:
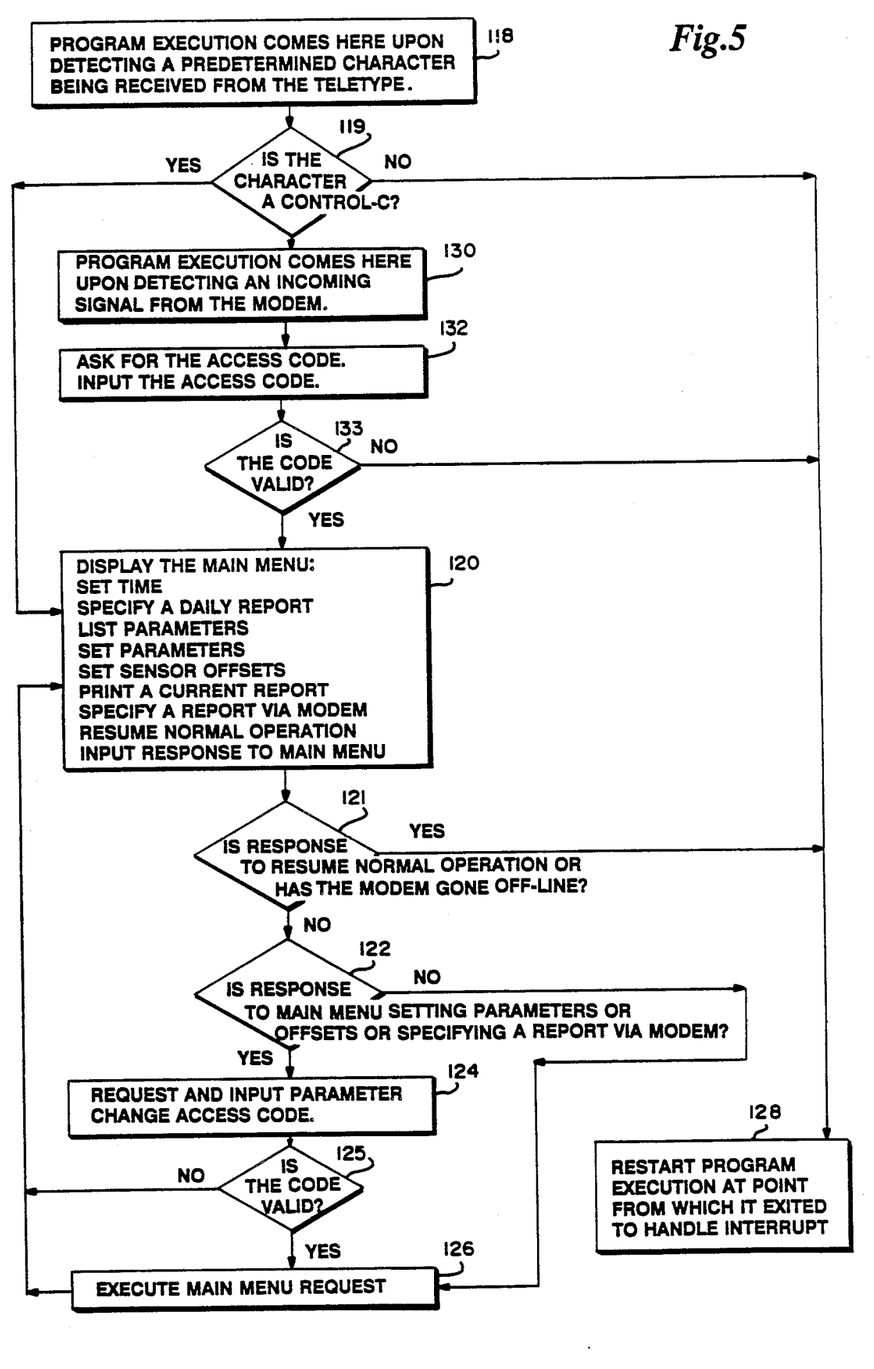

FIGS. 4 and 5 are flowcharts delineating the sequence of operations performed by microcomputer 14 in monitoring a ground system in accordance with an exemplary embodiment of the present invention. Turning first to FIG. 4, as indicated in FIG. 4 at block 100, the microcomputer 14 upon startup (or after a system reset) initializes the system. In this regard, for example, central processing unit registers are initialized to provide proper operation. Additionally, modem 20 is set to the proper baud transmission rate. With respect to block 100, if a request for a sensor status report is received from either the teletype 18 or modem 20, an interrupt will be generated which causes microcomputer 14 to halt all other processing and initialize its registers to generate a ground conductor alarm/status report on demand. Additionally, after a power failure, block 100 is entered to initialize the system to recover from the power failure.

Thereafter, as indicated at block 102, the readings for all sensors S1 through SN are zeroed. In this regard, the capacitors 62 and 64 shown in FIG. 3 are discharged so that a zero output reading is obtained. In this fashion, the impact of any previously detected surge on subsequent output data reports will be negated. Accordingly, the output data is set to zero after each scan of the bank of ground conductor sensors.

Thereafter, all the channels are scanned in order to obtain data from the sensors S1 through SN via analog-to-digital converter 10 (104). The microcomputer 14 stores in for example RAM 26 digital representations of the positive and negative surge signals, AC level and DC level signals for each of the sensors S1 through SN.

Thereafter, as indicated at block 106, readings for each sensor are adjusted by an "offset" value. With respect to the sensor offset value, it is noted that when the main menu is displayed as, (which will be described further below in conjunction with block 120), the user may select a "set sensor offsets" entry. By selecting this main menu entry, "offsets" for each sensor may be set. In this regard, readings are taken at the point where the Hall-effect sensors are to be installed. The readings (which ideally should be zero) are however, taken not with the sensor installed around the ground conductor, but in the region where the sensor is to be installed. Such a reading reflects contributions due to the earth's magnetic field or other factors which must be compensated for. A large number of such readings are taken and are averaged for each sensor. The average reading for each of the sensors serves as the "offset" referred to in block 106. These offsets are stored in RAM 26.

Accordingly, in block 106 each of the values received from analog-to-digital 10 is adjusted to reflect the previously determined offset value to thereby result in a more accurate reading. By way of example only, if the offset value for sensor $S_1$ is 1 amp and a reading for sensor $S_1$ yielded 5 amps, then the value which will be used to compare with predetermined parameters at block 108 will be 4 amps.

Thereafter, a comparison is made between the adjusted readings for each sensor S1 through SN with threshold parameters for the selected channels (block 108). A check is then made at block 109 to determine whether the set parameter has been exceeded by the adjusted reading as indicated by the comparison in block 108. If the parameter has not been exceeded, then a determination is made as to whether a daily report has been specified (110). If a daily report has not been specified, then the routine branches back to block 104 to repeat the scanning of all channels. If the check at block 109 indicates that the parameter has been exceeded, a report is issued via block 114.

If a daily report has been specified, then a check is made at block 112 to determine whether a daily report has been issued today. If so, then the routine branches back to block 104 to repeat the scanning of all the channels. If a daily report has not yet been issued, then as indicated by the block at 114, a daily report is generated on the teletype 18. A check is made at block 115 to determine whether a report via modem 20 has been specified. If a report via the modem 20 has not been specified then the routine branches back to block 104 to repeat the scanning sequence.

If the report via the modem 20 has been specified, in addition to issuing a report on teletype 18, a number which has been previously specified is dialed. If the dialed number is not answered within 30 seconds, then the routine branches back to block 104. If there is an answer, then a report is transmitted to the called station (116). Thereafter, the routine branches back to block 104 to continue the scanning and other processing steps set forth in blocks 104-114.

Turning now to FIG. 5, if a predetermined control character is transmitted from teletype 18, a microcomputer interrupt is generated (118). The microcomputer 14 interrupt is triggered by its detection of a control character (e.g., C) from the teletype 18. The microcomputer 14 branches to a portion of the routine which initiates the display of the main menu (120). If a control character is not detected at block 118, then the routine branches to block 128 to resume normal processing.

As indicated at block 120, the user by selecting one of the displayed main menu entries shown in FIG. 5 may initiate a ground system monitor control function. In this regard, the operator by selecting an entry shown in block 120 may access a more detailed menu to set the time, specify that a daily report should be generated at a predetermined time and initiate a listing of the parameters that have been set.

A "list parameters" selection initiates an accessing of RAM 26 to retrieve those threshold parameter values with which the data generated by the Hall-effect sensors is to be compared. If the "set parameters" mode is selected, then the parameters may be changed. If the "set sensor offset" mode is selected via the main menu, then the offset values described above in conjunction with block 106 may be set. It is noted that for an operator to change or set parameters to set sensor offsets, the system requires the entry of an authorized access code.

Figure 6:
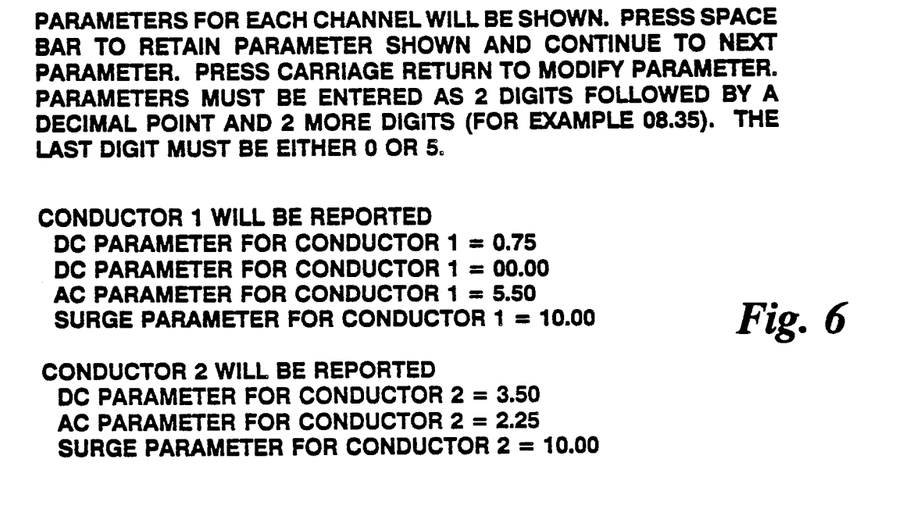
FIG. 6 is an exemplary display used to permit operator to modify parameters.

If the operator selects the "set parameters" entry on the main menu, a display is generated such as that shown in FIG. 6. As indicated in FIG. 6, if the operator wants to retain parameters related to, for example, ground conductor 1 or ground conductor 2, the operator is directed to press a space bar which triggers the stepping to the next parameter. To modify a parameter, the carriage return key is pressed. The operator is also prompted with information indicating how the parameter modification data should be entered.

As shown in block 120, the operator may initiate the generation of a current report based on the most recently detected sensor values. The "specifying of report" mode allows the operator to select the generation of a report either via teletype 18 or modem 20. In the modem mode, the operator is prompted to enter the desired telephone number which is utilized in block 116 as described above. If the resume normal operation mode is set, then the routine branches back to block 100 as shown in FIG. 4.

Turning next to block 130, if the microcomputer 14 senses a carrier signal via serial input/output interface 16 from the modem 20, normal processing is interrupted and the routine operates to prompt the calling party to input an appropriate access code (132). A check is then made to determine whether the access code is valid (133). If not, the routine branches to block 128 which causes program execution to return to the point from which it exited to handle the interrupt. By use of this access code, unauthorized calling parties are precluded from getting on&o the system. If the access code is valid, the system is entered and the main menu is displayed (120).

As indicated at block 121, if the main menu selection by the operator is either to resume normal operation or if the modem 20 (whose presence is detected by microcomputer 14 at block 130) has gone offline, then the routine branches to block 128 and normal operations are resumed. If, however, the operator decides to set parameters or offsets, or to specify a report via modem, then as indicated by the check at 122, the operator is requested to input a parameter change access code (124). Thereafter, a check is made to determine whether the access code is valid (125). If the access code is valid then the main menu request is executed (126) and the routine branches back to the main menu via block 120. If the access code is not valid, then an invalid parameter change access code message is displayed to the operator and the routine branches back to the main menu. Turning back to block 122, if the response to the main menu does not involve setting parameters or offsets or specifying a report via modem then the main memory request is executed (126).

Figure 7A:
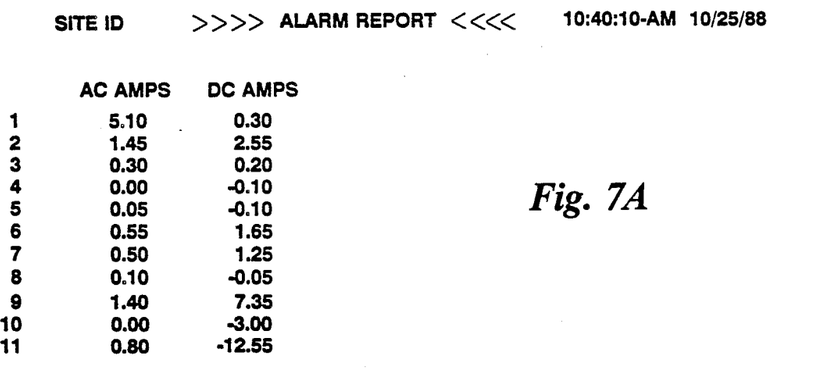
FIGS. 7A and 7B are exemplary alarm reports.
Figure 7B:
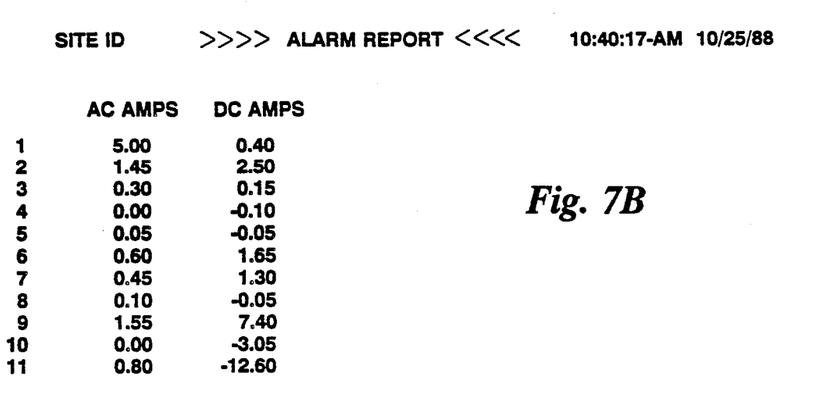

FIGS. 7A and 7B depict exemplary alarm reports generated at a site at which the microprocessor controlled ground system monitor of the present invention has been installed. The alarm reports shown in FIGS. 7A and 7B indicate the time and date of the generated alarm report. These reports are automatically generated if the comparison in block 109 of FIG. 4 reveals that a parameter has been exceeded. As shown in FIGS. 7A and 7B, the alarm reports indicate AC and DC current surges for identified sensors at an identified site.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. For use with electrical equipment having a ground system including a plurality of ground conductors, a ground system monitor comprising:
   means for monitoring current on each of said plurality of ground conductors;
   processing means for comparing signals indicative of the current on each of said ground conductors with a predetermined threshold;
   means for coupling signals indicative of the monitored current on each of said ground conductors to said processing means;
   said processing means including means responsive to said means for comparing to initiate generation of a report indicating the current on said ground conductors; and
   output means responsive to said processing means for producing said report.

2. A ground system monitor according to claim 1, wherein said means for monitoring includes a Hall-effect sensor associated with each of said ground conductors.

3. A ground system monitor according to claim 1, further including means coupled to said means for monitoring for generating signals indicative of the AC and DC current levels on each of said plurality of conductors.

4. A ground system monitor according to claim 1, further including memory means coupled to said processing means for storing data relating to the current flow on each of said ground conductors.

5. A ground system monitor according to claim 1, further including means for transmitting said report to a remotely located site.

6. A ground system monitor according to claim 1, wherein each of said plurality of ground conductors is coupled to a master ground bar and is associated with Hall-effect sensor means for generating a signal indicative of current flow through said ground conductor.

7. A ground system system monitor according claim 1, further including interactive means for permitting an operator to initiate ground system monitor control functions.

8. A ground system monitor according to claim 1, wherein said processing means includes means for enabling an operator to set said predetermined threshold.

9. A ground system monitor according to claim 1, wherein said processing means including means for adjusting said signals indicative of the current flow on each of said plurality of ground conductors to compensate for environmental conditions.

10. A ground system monitor according to claim 1, wherein said electrical equipment having a ground system including said plurality of ground conductors includes means for performing telephone switching operations.

11. A ground system monitor according to claim 1, wherein said processing means includes interactive means for permitting an operator to initiate ground system monitor control functions.

12. A ground system monitor according to claim 1, further including means coupled to said means for monitoring for generating signals indicative of AC and DC current surges for each of said plurality of conductors.

13. A ground system monitor according to claim 12, wherein said means for generating further includes means for generating signals indicative of the AC and DC current levels on each of said plurality of conductors.

14. A ground system monitor according to claim 1, wherein said means for coupling includes multiplexer means for receiving a plurality of inputs from said means for monitoring and for selectively generating on a multiplexer output, an output signal indicative of the current flow on one of said plurality of ground conductors.

15. A ground system monitor according to claim 14, wherein said processing means includes scanning means for controlling receipt of data from said multiplexer output relating to each of ground conductors, said scanning means including means coupled to said multiplexer means for identifying which of the plurality of inputs is to be coupled to said output.

16. For use with electrical equipment having a ground system including a plurality of ground conductors, a ground system monitor comprising:
   means for monitoring current on each said plurality of ground conductors;
   means for processing signals indicative of the current on each of said ground conductors;
   means for coupling signals indicative of the monitored current on each of said ground conductors to said processing means; and
   means for receiving signals from said processing means for generating a report identifying the current flow on each of said ground conductors.

17. A ground system monitor according to claim 16, wherein said means for coupling includes multiplexer means for receiving a plurality of inputs from said means for monitoring and for selectively generating on a multiplexer output, an output signal indicative of the current flow on one of said plurality of ground conductors.

18. A ground system monitor according to claim 16, wherein each of said plurality of ground conductors is coupled to a master ground bar and each of said plurality of ground conductors is associated with Hall-effect sensor means for generating a signal indicative of current flow through said ground conductor.

19. A ground system monitor according to claim 16, further including means coupled to said means for monitoring for generating signals indicative of AC and DC current levels for each of said plurality of conductors.

20. A ground system monitor according to claim 19, wherein said means for generating signals indicative AC and DC current levels includes means for generating signals indicative of the AC and DC current surges on each of said plurality of conductors.

21. For use with electrical equipment having a ground system including a plurality of ground conductors, a method for monitoring the ground system associated with said electrical equipment comprising the steps of:
   monitoring the current on each of said plurality of ground conductors;
   generating signals indicative of the current on each of said ground conductors;
   processing said signals indicative of the current on each of said ground conductors; and
   generating a report identifying the current on each of said ground conductors.

22. A method according to claim 21, wherein said processing step includes the step of comparing signals indicative of the current flowing on each of said ground conductors with a predetermined threshold.

23. A method according to claim 21, wherein said step of generating includes the step of generating signals indicative the AC and DC current surges for each of said plurality of conductors.

24. A method according to claim 21, wherein said step of generating includes the step of generating signals indicative of the AC and DC current levels on each of said plurality of conductors.

25. A method according to claim 21, wherein said processing step includes the step of controlling the receipt of data relating to each of ground conductors.

26. A method according to claim 21, further including storing data relating to the current flow on each of said ground conductors.

27. A method according to claim 21, further including transmitting said report to a remotely located site.

28. A method according to claim 21, wherein said processing step includes the step of interactively, permitting an operator to initiate ground system monitor control functions.

29. A method according to claim 21, wherein said processing step including the step of adjusting said signals indicative of the current flow on each of said plurality of ground conductors to compensate for environmental factors.

* * * * *